United States Patent [19]

Steigerwald

[11] Patent Number: 4,628,426
[45] Date of Patent: Dec. 9, 1986

[54] DUAL OUTPUT DC-DC CONVERTER WITH INDEPENDENTLY CONTROLLABLE OUTPUT VOLTAGES

[75] Inventor: Robert L. Steigerwald, Scotia, N.Y.

[73] Assignee: General Electric Company, Schenectady, N.Y.

[21] Appl. No.: 793,430

[22] Filed: Oct. 31, 1985

[51] Int. Cl.⁴ ............................................. H02M 3/335
[52] U.S. Cl. ........................................ 363/17; 363/21; 363/26; 363/79; 363/98; 363/132; 363/134; 336/184
[58] Field of Search ..................... 363/17, 20, 21, 24, 363/25, 26, 79, 98, 131, 132, 133, 134, 28; 336/180, 182, 184

[56] References Cited

U.S. PATENT DOCUMENTS 4,353,113 10/1982 Billings .................................. 363/41
4,356,542 10/1982 Bruckner et al. ..................... 363/26

OTHER PUBLICATIONS

Kohno and Kuwabara, *Single-Ended DC-to-DC Converter with Two Individually Controlled Outputs*, Fujitsu Scientific and Tech. J. (Mar. 1980), 23–37.

Dauhajre and Middlebrook, *Simple PWM–FM Control for an Independently-Regulated Dual Output Converter*, Proceedings of Powercon 10 (Mar. 1983), 1–8.

Primary Examiner—Patrick R. Salce
Assistant Examiner—Anita M. Ault
Attorney, Agent, or Firm—Marvin Snyder; James C. Davis, Jr.

[57] ABSTRACT

A single DC power switching converter feeds two DC load circuits from two transformer secondary windings. One winding is tightly coupled to the primary and its output voltage is controlled using pulse-width modulation. The other secondary winding is loosely coupled to the primary so that its leakage inductance resonates with a secondary capacitor such that its output is controlled by converter frequency adjustment. Thus, both output voltages are controlled using a single power switching stage.

9 Claims, 8 Drawing Figures

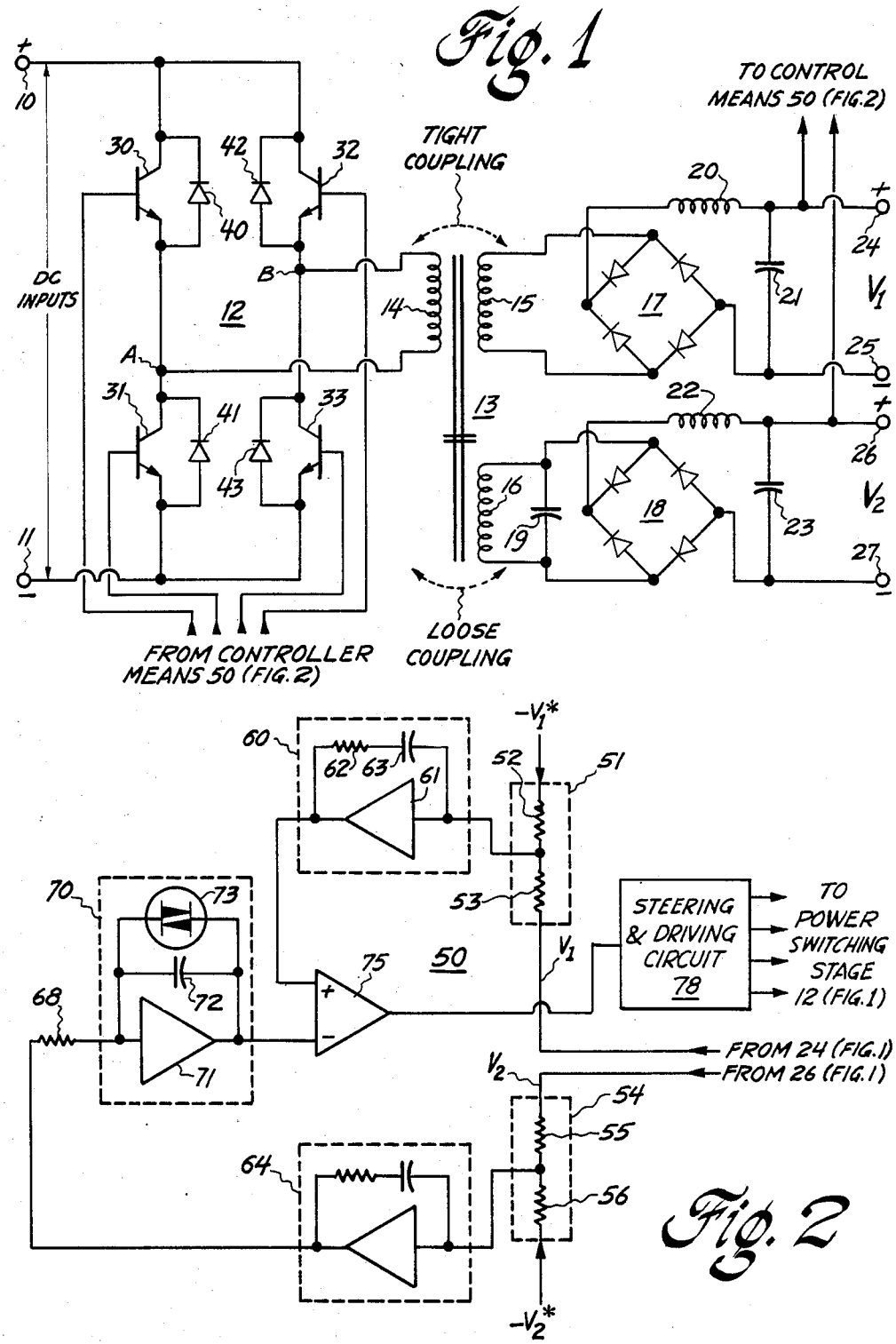

FROM CONTROLLER
MEANS 50 (FIG.2)

4,628,426

DUAL OUTPUT DC-DC CONVERTER WITH INDEPENDENTLY CONTROLLABLE OUTPUT VOLTAGES

BACKGROUND OF THE INVENTION

The present invention relates in general to a power supply having two DC outputs, and more specifically to a power supply employing a transformer with two secondary windings, one secondary winding being tightly coupled to the primary winding and the other secondary winding being loosely coupled to the primary winding, one DC output voltage being regulated by pulse-width modulation and the other DC output voltage being regulated by frequency modulation.

In power supplies with multiple output voltages, each output voltage is usually regulated by a separate series-pass regulator. This technique has high losses and also a high parts count making it undesirable.

A DC-DC converter is known wherein two individually controlled outputs are obtained by combining a buck circuit and a buck-boost circuit. A transformer is employed having two secondary windings, each tightly-coupled to the primary winding. The buck circuit is connected to one secondary winding and the buck-boost circuit is connected to the other secondary winding. In this converter, the buck circuit is operated such that its output inductor carries continuous current, while the buck-boost circuit is operated such that its output inductor carries discontinuous current. This allows the output voltage of the buck circuit to be controlled by adjusting the duty ratio of the AC signal supplied to the transformer primary winding. The output voltage of the buck-boost circuit is regulated by adjusting the frequency of the AC signal. However, due to the discontinuous inductor current of the buck-boost circuit, its output current is rather limited. Furthermore, since the buck circuit must operate in a continuous inductor current mode, it has a minimum output current under all conditions. Thus, the output voltages of this converter are controlled only within limited output current ranges.

Accordingly, it is a principle object of the present invention to provide a power supply with two independently controllable output voltages which operates in an efficient manner and with a low parts count.

It is a further object of the invention to provide a dual output DC-DC converter with two independently controllable output voltages wherein the output voltages may be regulated over a wide output current range.

SUMMARY OF THE INVENTION

These and other objects are achieved in a DC-DC converter comprising a transformer, DC to AC conversion means, first and second rectifying and filtering means and controller means. The transformer has a primary winding, a tightly-coupled secondary winding having substantially no leakage inductance, and a loosely-coupled secondary winding having a predetermined leakage inductance. The DC to AC conversion means is connected to the primary winding and is adapted to be connected to a DC supply. The DC to AC conversion means supplies a variable frequency, variable duty cycle AC signal to the primary winding.

The first rectifying and filtering means is coupled to the tightly-coupled secondary winding for providing a first DC output voltage. The second rectifying and filtering means is coupled to the loosely-coupled secondary winding for providing a second DC output voltage. The controller means is coupled to the first and the second rectifying and filtering means and to the DC to AC conversion means. The controller means adjusts the duty cycle of the AC signal to regulate the first DC output voltage in response to a first voltage command. The controller means also adjusts the frequency of the AC signal to regulate the second DC output voltage in response to a second voltage command.

The converter may also include a resonant capacitor coupled across the loosely-coupled secondary winding. In that case, the frequency of the AC signal is greater than the resonant frequency of the combination of the predetermined leakage inductance and the resonant capacitor.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

FIG. 1 is a schematic diagram of a portion of the DC-DC converter of the invention.

FIG. 2 is a schematic diagram of the controller circuit of the present invention.

DETAILED DESCRIPTION OF THE INVENTION

Figure 3:
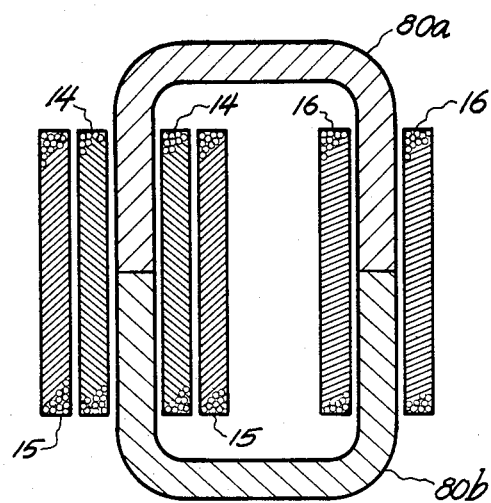
FIG. 3 is a cross-sectional view of the transformer of FIG. 1 wound on a split-C core.

Referring now to FIG. 1, an apparatus for converting a DC input voltage to a pair of DC output voltages $V_1$ and $V_2$ will be described. The apparatus includes a pair of DC input terminals, positive terminal 10 and negative terminal 11. A power switching stage or DC to AC converter 12 is connected across terminals 10 and 11 for converting the DC input voltage to a AC signal. A full-bridge switching circuit is shown including power switches 30–33 connected to anti-parallel snubber diodes 40–43, respectively. Power switches 30–33 are shown as power transistors in FIG. 1, although other devices may alternatively be used such as field-effect transistors (FETs), silicon controlled rectifiers, (SCRs), and gate turn-off thyristors (GTOs). The bases of power switches 30–33 are connected to a controller means 50 which will be described below with reference to FIG. 2.

A transformer 13 includes a primary winding 14 which is connected to the outputs of DC to AC converter 12. A secondary winding 15 is tightly coupled with primary winding 14 so that very little leakage inductance is introduced between primary winding 14 and secondary winding 15. Transformer 13 also includes a secondary winding 16 which is loosely coupled with primary winding 14 so that a predetermined leakage inductance is introduced between primary winding 14 and secondary winding 16. A diode-bridge rectifier 17 is connected across secondary winding 15 and a diode-bridge rectifier 18 is connected across secondary winding 16. A resonant capacitor 19 is also connected across secondary winding 16.

A DC output filter including inductor 20 and capacitor 21 is connected across the output of rectifier 17 and provides a first DC output voltage $V_1$. A DC output filter including inductor 22 and capacitor 23 is connected to the outputs of rectifier 18 and provides a second DC output voltage $V_2$.

Figure 8:
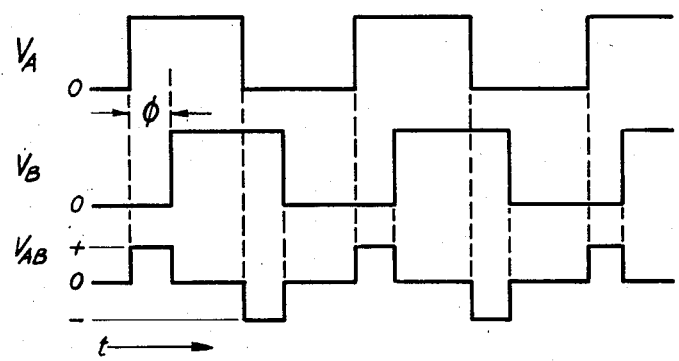
FIG. 8 is a waveform diagram showing voltages associated with the converter of FIG. 1.

DC to AC converter 12 is operated by signals from controller means 50 in a manner which provides square waves of voltage at the outputs A and B of each converter leg, respectively. As shown in FIG. 8, the square waves of voltage ($V_A$ and $V_B$) from the converter legs are phase shifted with respect to each other by an angle $\phi$ so that an AC signal ($V_{AB}$) comprised of rectangular pulses is supplied to primary winding 14. The angle $\phi$ may be varied to pulse-width modulate the duty cycle of the AC signal. Since at least one of power switches 30–33 is always conducting when using the pulse-width modulation scheme of FIG. 8, then there is always a path for any circulating current from tightly-coupled secondary winding 15 in the event that it is carrying a smaller load current then secondary winding 16.

The AC signal of DC to AC converter 12 may alternatively be generated by alternately switching on and off diagonal pairs of power switches 30–33 (e.g. one pair of switches including power switches 30 and 33). However, using this switching scheme ensures that there will be times that all of power switches 30–33 are off, so as to avoid short-circuiting the DC input terminals. At those times there will be no low-voltage circulating path on the primary side of transformer 13. Therefore, when using this scheme, it is preferable to connect the higher current load to $V_1$ in order to avoid interactions due to circulating current.

Since secondary winding 15 is tightly coupled to primary winding 14, DC output voltage $V_1$ is controlled by pulse-width modulation of the duty ratio of the AC signal provided to primary winding 14 ($V_{AB}$) and is substantially independent of the frequency of the AC signal.

The leakage inductance of secondary winding 16 resonates with capacitor 19 so that the voltage across capacitor 19 (and hence the DC output voltage $V_2$) is a function of the frequency of the AC signal produced by DC to AC converter 12, the load connected between terminals 26 and 27, and the magnitude of the AC signal (e.g. duty cycle). Output voltage $V_2$ can therefore be controlled by adjusting the frequency of the AC signal. Converter 12 is preferably operated at a frequency above the resonant frequency of the combination of the leakage inductance and capacitor 19. Thus, if the load increases, the output voltage $V_2$ can be maintained constant by lowering the frequency of the AC signal, and vice-versa. This change in frequency ideally does not affect the DC voltage $V_1$ because that output depends on pulse duty cycle and not on frequency. A change in pulse duty cycle to regulate $V_1$ will also affect the output voltage $V_2$. However, output voltage $V_2$ is easily regulated by adjusting frequency (which in turn does not affect $V_1$).

A controller means 50 for regulating the DC output voltages $V_1$ and $V_2$ is shown in FIG. 2. DC output voltage $V_1$ is supplied to a summing means 51 from output terminal 24 (FIG. 1). An externally supplied voltage command $-V_1^*$ also is coupled to summing means 51. Summing means 51 may for example comprise a pair of resistors 52 and 53 operating as a voltage divider. Thus, the output signal of summing means 51 will be proportional to the error between the actual output voltage $V_1$ and the desired output voltage $V_1^*$. The output of summing means 51 is connected to the input of a compensator gain block 60 shown as a proportional-and-integral (P&I) controller. The P&I controller is a commercially standard device and is shown to include an operational amplifier 61, a resistor 62 and a capacitor 63. The output of compensator gain block 60 is connected to the non-inverting input of a comparator 75. Compensator gain block 60 may alternatively comprise a lead-lag compensator.

DC output voltage $V_2$ is coupled to a summing means 54 from output terminal 26 (FIG. 1). An externally supplied voltage command $-V_2^*$ is also coupled to summing means 54. Summing means 54 is also shown as a voltage divider comprised of resistors 55 and 56. The output of summing means 54 is coupled to a compensator gain block 64 similar in circuitry to compensator gain block 60. The output of compensator gain block 64 is coupled to a ramp generator 70 through a resistor 68. Ramp generator 70 generates a variable frequency ramp signal having a constant peak amplitude but variable rising-edge slope in accordance with the output of compensator gain block 64. Ramp generator 70 may comprise the parallel connection of an operational amplifier 71, a capacitor 72 and a DIAC 73, for example. The variable ramp signal is coupled to the inverting input of comparator 75. The output signal of comparator 75 has a variable frequency and variable duty cycle and is used to derive switching signals for converter 12 of FIG. 1 by steering and driving circuit 78. Steering and driving circuit 78 produces four output signals for connecting to switches 30–33, respectively, of FIG. 1. In other embodiments of DC to AC converter 12 using a different number of power switches, steering and driving circuit 78 is adapted to provide the control signals required by converter 12.

FIG. 3 shows an exemplary construction for transformer 13. A split-C core comprised of core half 80a and core half 80b has primary winding 14 and secondary winding 15 wound on one leg. Secondary winding 16 is wound alone on the other leg of the core in order to establish the desired leakage inductance.

Figure 4:
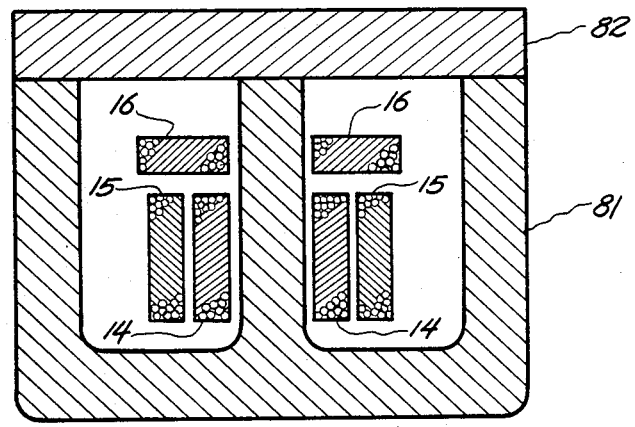
FIG. 4 is a cross-sectional view of the transformer of FIG. 1 wound on a EI core.

An alternative construction for transformer 13 is shown in FIG. 4. An EI core is shown to comprise an E portion 81 and an I portion 82. Primary winding 14 is wound on one portion of the center leg of the core and secondary 15 is layered on top of primary winding 14. Secondary winding 16 is also wound on the center leg of the core but is axially offset from the other windings to introduce the desired leakage inductance.

Figure 5:
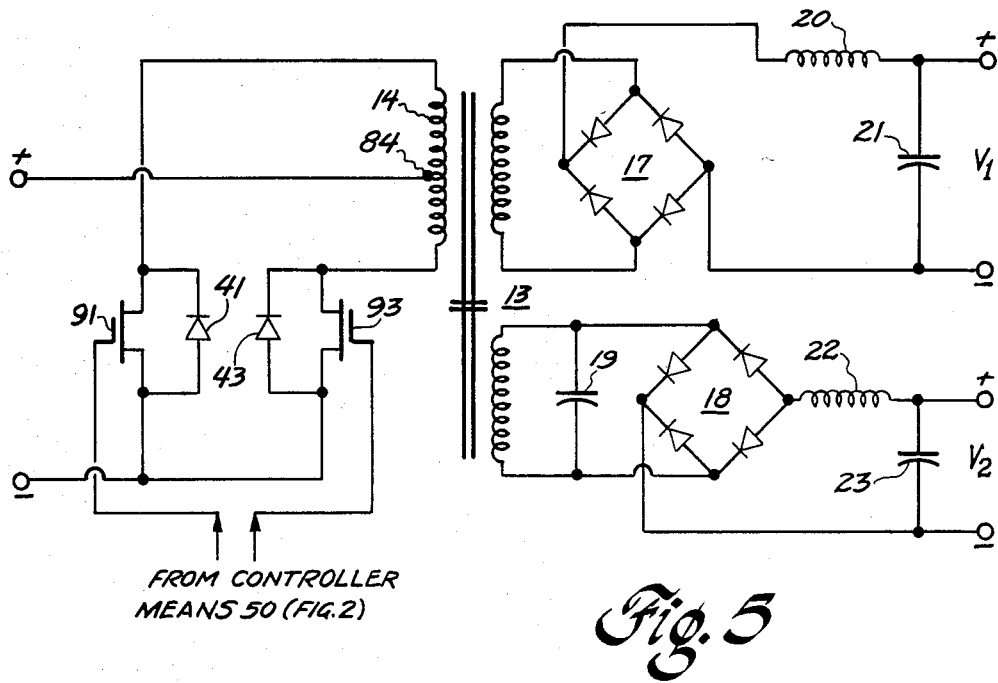
FIG. 5 is a schematic diagram of the converter of the invention employing a push-pull switching circuit.

FIG. 5 shows an alternative embodiment for DC to AC converter 12 of FIG. 1. Primary winding 14 is shown to include a center tap 84 which is connected to the positive DC input terminal. A pair of FET switches 91 and 93 are connected in a push-pull configuration for supplying the AC signal to the primary winding by alternate conduction of switches 91 and 93.

Figure 6:
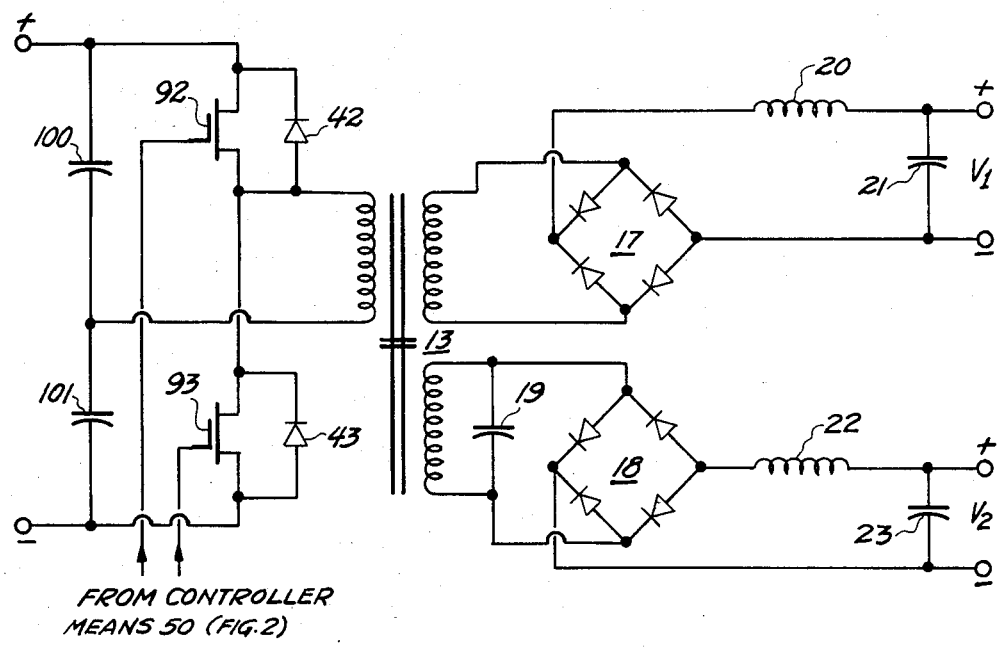
FIG. 6 is a schematic diagram of the converter of the invention employing a half-bridge switching circuit.

Another alternative embodiment for converter 12 of FIG. 1 is shown in FIG. 6. This is a half-bridge configuration with FET switches 92 and 93 connected in one leg of the converter and a pair of capacitors 100 and 101 connected in the other leg of the converter. Thus, an AC signal is provided to primary winding 14 by alternate conduction of switches 92 and 93.

Figure 7:
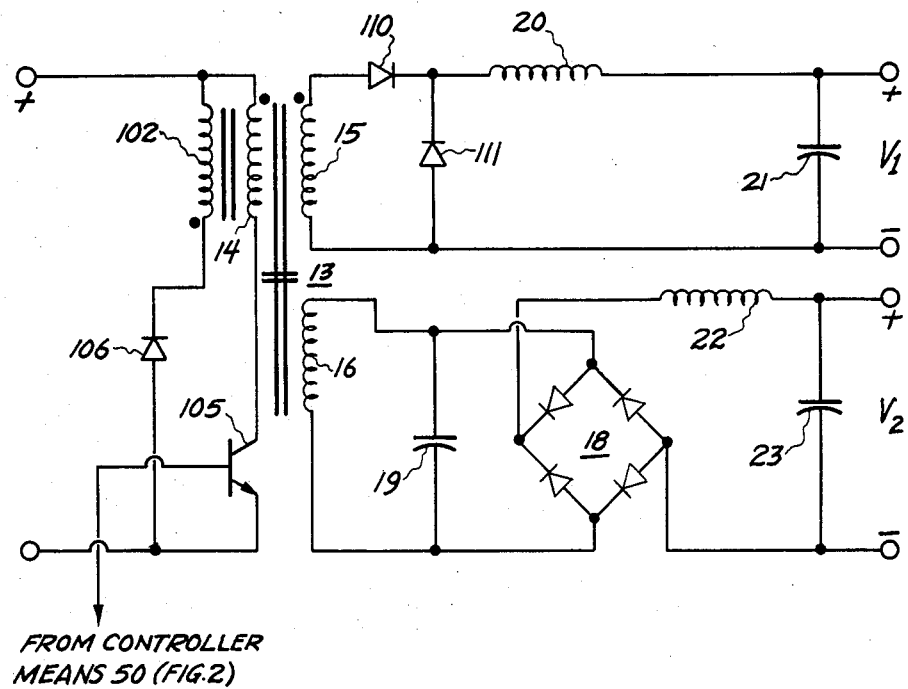
FIG. 7 is a schematic diagram of the converter of the invention employing a single-ended switching circuit.

FIG. 7 shows a single-ended version of converter 12. In this embodiment, primary winding 14 is wound bifilar with a reset winding 102. A diode 106 is connected in series with winding 102 and a power switch 105 is connected in series with primary winding 14. A pair of diodes 110 and 111 are coupled across secondary winding 15 for rectifying the output voltage of the forward converter. In the alternative embodiments described in FIGS. 5-7, the secondary circuits for generating a pair of independently controllable output voltages operate as described with reference to FIG. 1. However, since none of the circuits of FIGS. 5-7 can provide a low-voltage circulating path on the primary side of transformer 13, the highest current load should be connected to the terminals providing output voltage $V_1$.

The foregoing has described a dual output power supply having high efficiency and reduced parts count. The voltage regulation is achieved over a wide range of output current since regulation does not depend on continuous or discontinuous conduction of the output inductors. If more than two independently controlled outputs are needed, then conventional series-pass regulators can be used for the additional output voltages. The series-pass regulators would be used for the lowest power outputs while the dual mode control will be used for the higher power outputs so that the most energy-efficient system would result.

While preferred embodiments of the present invention have been shown and described herein, it will be obvious that such embodiments are provided by way of example only. Numerous variations, changes and substitutions will occur to those skilled in the art without departing from the spirit of the invention. Accordingly, it is intended that the invention be limited only by the scope of the appended claims.

What is claimed is:

1. A DC-DC converter comprising:
   a transformer having a primary winding, a tightly-coupled secondary winding having substantially no leakage inductance, and a loosely-coupled secondary winding having a predetermined leakage inductance;
   DC to AC conversion means connected to said primary winding and adapted to be connected to a DC supply, said DC to AC conversion means for supplying a variable frequency, variable duty cycle AC signal to said primary winding;
   first rectifying means coupled to said tightly-coupled secondary winding for providing a first DC output voltage;
   second rectifying means coupled to said loosely-coupled secondary winding for providing a second DC output voltage; and
   controller means coupled to said first and said second rectifying means and to said DC to AC conversion means for adjusting the duty cycle of said AC signal to regulate said first DC output voltage in response to a first voltage command and for adjusting the frequency of said AC signal to regulate said second DC output voltage in response to a second voltage command.

2. The converter of claim 1 further comprising a resonant capacitor coupled across said loosely-coupled secondary winding and wherein the frequency of said AC signal is greater than the resonant frequency of the combination of said predetermined leakage inductance and said resonant capacitor.

3. The converter of claim 2 wherein said controller means comprises:
   first summing means coupled to said first rectifying means for generating a first error signal proportional to the difference between said first DC output voltage and its commanded value;
   a first compensator gain block having its input coupled to the output of said first summing means;
   second summing means coupled to said second rectifying means for generating a second error signal proportional to the difference between said second DC output voltage and its commanded value;
   a second compensator gain block having its input coupled to the output of said second summing means;
   a ramp generator having its input coupled to the output of said second compensator gain block for generating a ramp signal having a frequency proportional to the output signal amplitude of said second compensator gain block;
   a comparator having one input coupled to the output of said ramp generator and having its other input coupled to the output of said first compensator gain block; and
   steering and driving means coupled to said comparator and to said DC to AC conversion means for controlling the frequency and duty cycle of said AC signal in accordance with the output signal of said comparator.

4. The converter of claim 1 wherein said transformer further includes a split-C core, said primary winding and said tightly-coupled secondary winding being wound on one leg of said core and said loosely-coupled winding being wound on the other leg of said core.

5. The converter of claim 1 wherein said transformer further includes an EI core, said primary winding and said tightly-coupled secondary winding being layered on the center leg of said core and said loosely-coupled secondary winding being wound on said center leg axially offset from the other windings.

6. The converter of claim 1 wherein said DC to AC conversion means comprises a full-bridge switching circuit.

7. The converter of claim 1 wherein said primary winding is center-tapped and wherein said DC to AC conversion means comprises a push-pull switching circuit.

8. The converter of claim 1 wherein said DC to AC conversion means comprises a half-bridge switching circuit.

9. The converter of claim 1 wherein said primary winding includes a pair of bifilar windings and wherein said DC to AC conversion means comprises a single-ended switching circuit.

* * * * *